CHARLES A. SEELY.
Improvement in Ice Machines.
No. 119,795. Patented Oct. 10, 1871.
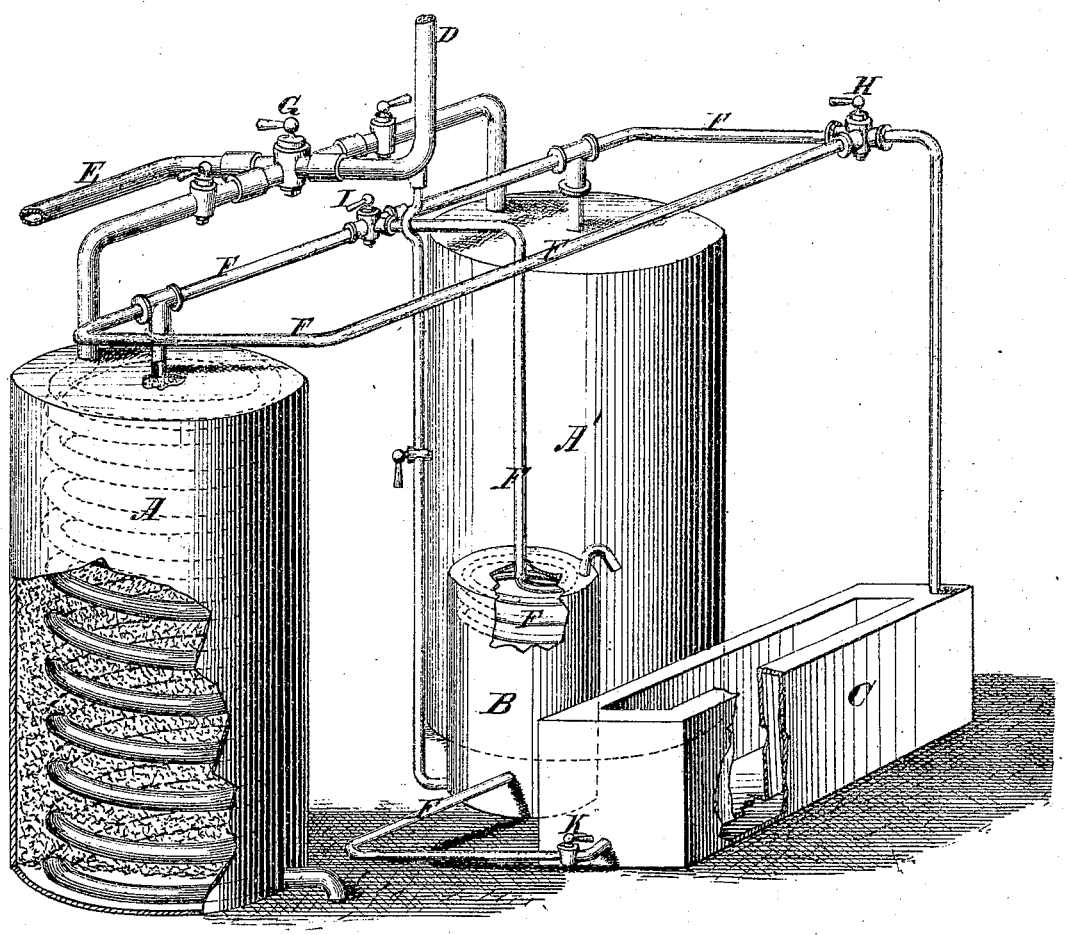
Witnesses:
John Becker
Inventor:
Charles A. Seely

UNITED STATES PATENT OFFICE.

CHARLES A. SEELY, OF NEW YORK, N. Y.

IMPROVEMENT IN ICE-MACHINES.

Specification forming part of Letters Patent No. 119,795, dated October 10, 1871.

*To all whom it may concern:*

Be it known that I, CHARLES A. SEELY, of the city, county, and State of New York, have invented certain Improvements in Ice-Making and Refrigeration, of which the following is a specification:

My invention relates to the use of dry chloride of calcium as an absorbent of anhydrous ammonia. In my ice-machine the source of the refrigeration is the rapid evaporation of anhydrous liquid ammonia, and this rapid evaporation is secured and maintained by employing the chloride of calcium to absorb the vapor of ammonia as fast as it is formed. By such use the chloride of calcium becomes charged with ammonia and thus serves as a convenient retainer of the ammonia until it is again to be isolated and liquefied. From the chloride of calcium charged with ammonia the latter is expelled by heat in the form of vapor, and the vapor is reduced to the liquid state by pressure and cooling. It will thus be seen that the same ammonia may be absorbed, expelled, condensed, and evaporated an indefinite number of times by the use of the same chloride of calcium, and that at each evaporation of the liquid ammonia an available refrigeration is secured.

A A' are vessels charged with dry chloride of calcium and provided with heating-coils. They are closed, except at the pipe-connections, and must be able to bear a pressure of about three hundred pounds to the square inch. I call these vessels generators. B is a condenser provided with a coil. This part of the apparatus corresponds to the condenser of a still. C is the refrigerator or freezer. D is a pipe conveying cold water. E is a pipe conveying steam or hot water. F is a pipe conveying vapor of ammonia, and F' is a pipe conveying liquefied ammonia. G is a four-way cock. H and I are three-way cocks. K is a check-cock.

The operation of the apparatus will be understood from the following explanation, supposing the following conditions and adjustments: The freezer C contains a quantity of ammonia sufficient to saturate the chloride of calcium of the generator A. The freezer is in communication with the chloride of calcium of A, while communication is cut off from A' by means of the cock I. Cold water flows through the coil of A by means of the pipe D and the cock G. The check-cock K is closed. These conditions being established, the liquefied ammonia of the freezer will be rapidly vaporized and the vapor will be absorbed by the chloride of calcium of the generator A. During this evaporation water may be frozen in the freezer. When all or nearly all the ammonia has evaporated the cocks are so changed that steam from the pipe E shall pass through the coil of A and cold water through the coil of A' and through the condenser B. The check-cock K is opened and adjusted. The generator A is in communication with the condenser and the generator A' with the freezer. Under this arrangement the ammonia is expelled from the chloride of calcium of A, is liquefied in B, flows into C, where it is volatilized, and finally it is absorbed by the chloride of calcium of A'. Again the cocks are changed so as to resume their first position. Now cold water flows through coil of A and steam through coil of A'; A' is open to the condenser and A to the freezer.

If the apparatus be made tight, so that no ammonia shall escape, the two changes of the process may be repeated indefinitely, and always with like effect, and by properly timing the changes the flow of liquefied ammonia through the check-cock K will be almost constant, the freezer will never become completely exhausted of liquefied ammonia, and the freezing will be practically continuous.

The generator is one of the principal features of my invention, while the condenser and the freezer do not differ materially from what were heretofore used for similar purposes. The generator, therefore, requires a more detailed description. I define the generator as a closed vessel, capable of resisting a high pressure from its interior, partly filled with dry pulverized chloride of calcium, provided with pipe-connections suitable for conveying vapor of ammonia from a vessel containing liquefied ammonia, and finally having devices for promptly heating and cooling the chloride of calcium. The form and size of the shell of the generator may be greatly varied to suit the amount of refrigeration desired and the convenience and judgment of the constructor. Some guide to the size of the whole and the proportion of its parts may be found in the following facts, which I have verified in my own practical experience: First, cold chloride of calcium absorbs and retains a little more than its weight of vapor of ammonia, and during the absorption increases to more than twice its original bulk. Second, the cooling power of the evaporation of one part by weight of liquefied ammonia is equivalent to the freezing of six and one-half parts of water, the ammonia having the initial temperature of 32° Fahrenheit. Also, the devices for heating and cooling may be greatly varied. When the generator is of small size, say about six inches in diameter, it may be provided with a jacket, through which the heating and cooling medium may alternately flow, or the shell may have one or more straight tubes traversing it for the flow of the heating and cooling medium. In short, any one of the devices for heating and cooling the contents of a closed vessel heretofore known and used may be employed in my invention.

In all cases where the shell of the generator is not used as the transmitter of the heating and cooling I find it advisable to line the interior of the shell with a non-conductor of heat, as thereby a considerable loss of the working force of heating and cooling will be prevented. The lining substance must be such as shall have no injurious action on the chloride of calcium or the ammonia.

In the drawing I have represented two generators; but without changing the size or form of the condenser or the freezer a third or more may be added. Whatever be the number of generators they should be operated successively, and the pipes and cocks must be arranged in harmony with their use. Also, a single generator may be used, and is, indeed, most convenient when it is desired to have the apparatus portable and on the small scale. In this case the condenser and freezer may be the same vessel, and a single pipe connecting the generator with the condenser and freezer combined is all that is necessary. The connecting-pipe is provided with a stop-cock, so that the liquefied ammonia may be retained in the freezer till the refrigeration is desired, at which time the cock is to be opened. Such an apparatus I call my household ice-machine.

The combined condenser and freezer, by providing it with an extra cock and suitable couplings, becomes detachable and portable. Thus the freezer becomes a proper receptacle of liquefied ammonia for transportation, and the liquefied ammonia in this way becomes a proper and desirable article of commerce. To carry out this part of my invention I intend that the generators shall be stationary and erected in private houses, hotels, hospitals, &c., where the refrigeration is desired, and that the liquefied ammonia shall be supplied to the possessors of the generators as fast as required. In this case each generator should have the capacity to absorb the ammonia from a dozen or more freezers.

I claim as my invention—

1. The process of refrigeration wherein chloride of calcium or its equivalent is employed as an absorbent of ammonia, substantially as described.

2. The generator A, constructed and operated as herein described.

3. The combination of the generator, the condenser, and the freezer.

4. The combination of the generator with the combined condenser and freezer.

CHARLES A. SEELY.

Witnesses:
J. BURROWS HYDE,
JAMES E. DE LANEY. (83)